United States Patent [19]
Carey et al.

[11] Patent Number: 5,956,706
[45] Date of Patent: Sep. 21, 1999

[54] METHOD AND SYSTEM FOR LIMITING THE CARDINALITY OF AN SQL QUERY RESULT

[75] Inventors: Michael James Carey, San Jose, Calif.; Donald Alan Kossmann, Passau, Germany

[73] Assignee: International Business Machines Corporation, Armonk, N.Y.

[21] Appl. No.: 08/853,685

[22] Filed: May 9, 1997

[51] Int. Cl.⁶ .................................................. G06F 17/30
[52] U.S. Cl. ................................................................ 707/2
[58] Field of Search ..................... 707/1–10, 100–104, 707/200–206

[56] References Cited

U.S. PATENT DOCUMENTS

| | | | |
|---|---|---|---|
| 4,769,772 | 9/1988 | Dwyer | 707/2 |
| 5,367,675 | 11/1994 | Chen et al. | 395/600 |
| 5,412,804 | 5/1995 | Krishna | 395/600 |
| 5,412,806 | 5/1995 | Du et al. | 707/2 |
| 5,530,939 | 6/1996 | Mansfiled, Jr. et al. | 395/600 |
| 5,546,570 | 8/1996 | McPherson, Jr. et al. | 395/600 |
| 5,548,754 | 8/1996 | Pirahesh et al. | 395/600 |
| 5,548,758 | 8/1996 | Pirahesh et al. | 395/600 |
| 5,598,559 | 1/1997 | Chaudhuri | 707/2 |
| 5,794,228 | 8/1998 | French et al. | 707/2 |
| 5,794,229 | 8/1998 | French et al. | 707/2 |

*Primary Examiner*—Ruay Lian Ho
*Attorney, Agent, or Firm*—Gray Cary Ware Freidenrich

[57] ABSTRACT

A STOP AFTER clause for a relational database management system (RDBMS) structured query language (SQL) causes the RDBMS, in response to a query, to return a query result having at most a predetermined cardinality specified in the query. A query with a STOP AFTER clause is processed by the RDBMS by provision of one or more STOP operators that are inserted into a query execution plan generated by the RDBMS to execute the query. In a conservative policy, STOP operators are inserted in the query execution plan such that no tuples that might be required in the query result are discarded. In contrast, an aggressive policy inserts a STOP operator in the query execution plan wherever it is able to provide a beneficial cardinality reduction. A RESTART operator is inserted into aggressive policy query execution plans to ensure that at least the predetermined number of tuples are returned in the query result, and a final STOP operator is added at or near the root of the plan to ensure that at most the specified number of tuples are produced.

25 Claims, 4 Drawing Sheets

FIG. 8 — Restart

FIG. 9 — Pruning A Subplan P1

METHOD AND SYSTEM FOR LIMITING THE CARDINALITY OF AN SQL QUERY RESULT

BACKGROUND OF THE INVENTION

1. Field of the Invention

The present invention relates generally to database management system query engines, and more particularly to enhancing the efficiency of query processing in a database management system by limiting the query result by a query-specified cardinality.

2. Description of the Related Art

A relational database management system (RDBMS) is a computer database management system that uses relational techniques for storing and retrieving data. Relational databases are computerized information storage and retrieval systems in which data in the form of tables (formally, "relations") are typically stored for use on disk drives or similar mass data stores. A "relation" includes a set of rows (formally, "tuples" or "records") spanning several columns (formally, "attributes"). A "tuple" expresses a mathematical relation between its "attributes" (column elements), while a "record" does not. Reference is made to C. J. Date, *An Introduction to Database Systems*, 6th Ed., Addison-Wesley, Reading, M. A. (1994) for general treatment of the relational database art.

An RDBMS is structured to accept commands to store, retrieve and delete data using high-level query languages such as the structured query language SQL (SQL). The term "query" denominates a set of commands for retrieving data from a stored database. The SQL standard has been promulgated by the International Standards Association since 1986. Reference is made, for example, to the SQL-92 Standard "Database Language SQL" published by the ANSI as ANSI X3.135–1992 and published by the ISO as ISO/IEC 9075:1992 for the official specification of the 1992 version of the Structured Query Language.

As used herein, a "query" refers to a set of user commands for retrieving data from a stored database. SQL is used to communicate queries to an RDBMS. SQL requires the return of a particular result set in response to a particular query, but the method of query execution ("Query Execution Plan") employed by the RDBMS is not specified by the query. There are typically many different useful execution plans for any particular query, each of which returns the required result set. For large databases, the execution plan executed by the RDBMS to execute a query must provide the required data return at a reasonable cost and time and hardware resource. Almost all RDBMSs include a query optimizer to translate queries into an efficiently executable plan. Query compilation and optimization for SQL are disclosed in detail in U.S. Pat. Nos. 5,367,675, 5,546,576 and 5,546,570, all assigned to the assignee of this application and incorporated in their entirety by this reference, and by U.S. patent application Ser. No. 08/394,532, filed Feb. 17, 1995 (now U.S. Pat. No. 5,619,692, issued, Apr. 8, 1997), which is also assigned to the assignee of this application and incorporated in its entirety by this reference.

Queries are submitted by users of the RDBMS. As understood in the art, the term "user" has a manifold meaning that encompasses, for example, a human operator, an application program, a remote machine, and so on.

As one example, a database might contain business data, and a user might want to know the past week's gross rental income for rental videos, ordered by income.

As another example of a query of a database, a user might want the RDBMS to retrieve a result set comprising images that resemble an input image, possibly ordered by resemblance, where resemblance is determined by a user-defined function on the image data type.

As recognized by the present invention, while highly effective as a database search language, it happens that SQL makes no provision for explicitly limiting the size ("cardinality") of result sets that are generated by an RDBMS in response to user queries. Instead, when it is desired to limit the number of tuples in a result set, an application program must request the entire result set from RDBMS and then fetch only the desired number of tuples from the result set.

Thus, in the first example SQL does not support a query that asks for only the ten images that most resemble the input image. In the second example there is no way to submit and execute a request for only the ten highest-grossing videos, ordered by income.

Unfortunately, the above-described shortcoming means that, for any query, the RDBMS must be ready to generate an entire result set, even though only a subset of the query result is desired, with the application program simply trimming the result set down to the desired size. Thus, for the first example above, every image in the database that satisfied a particular SQL-generated query plan, and not just the "closest" ten images, would likely be processed into the result set. Likewise, in the second example, the entire set of revenue-generating videos in the database would be processed into the result set.

Means are available in SQL for implicitly limiting result set size, for example, by limit testing. However, the efficacy of this technique depends upon making a good, informed guess as to how a specified limit divides the set of all possible results. SQL also provides means to limit the size of a subset of results that are returned to a user by specifying the size of a set of result items transferred from the RDBMS to the user from a result set generated by the RDBMS in response to the user's query. Neither of these SQL mechanisms, however, provides an explicit limit on the size of a result set that may be declared in a query.

As a consequence of entirely processing a query even when only a limited response is necessary, the response time of the RDBMS to execute the query can be prolonged unnecessarily, computing time wasted, and processing capacity reduced for concurrently executing multiple queries. Furthermore, the continuing growth in size and usage of relational databases compounds these problems. Moreover, by not incorporating a cardinality limitation in query results, an RDBMS cannot exploit additional cardinality-related information that otherwise would be available to it.

SUMMARY OF THE INVENTION

The present invention recognizes the desirability of incorporating an explicit cardinality-limiting operator in a database language that enables a user to limit the size of a query result. In addition, the present invention understands that any modification to existing database management systems that use SQL preferably requires a minimal change to the database management systems themselves. In other words, it is desirable that the specification of a cardinality limit in SQL require at most minimal or no changes to other operations of a database management system, such as join and merge.

Accordingly, it is an object of the present invention to provide a method and apparatus for explicitly limiting the cardinality of a query result at the level of an RDBMS engine. Another object of the present invention is to provide an operator for a database query language to limit the cardinality of a query result set. Still another object of the present invention is to provide a method and apparatus for limiting the cardinality of a query result produced by an RDBMS that is easy to use and cost effective.

The invention is an SQL extension that according to the inventive steps herein, causes a database management system to return a query result having a cardinality that is specified by a STOP AFTER clause in the query. In accordance with the present invention, an RDBMS generates a query execution plan having STOP operators in response to the query. In this regard, a STOP operator produces a desired number (N) of tuples of a query execution plan input stream. Thus, at least one STOP operator is inserted in the query execution plan such that the cardinality of the query result is no more than the specified cardinality.

In one preferred embodiment STOP operators are inserted as early as possible, in a conservative version of a query execution plan. The conservative version is characterized such that no tuples are ever discarded during query execution if it is possible that they may later be required in the query result.

According to another preferred embodiment, however, in an aggressive version of a query execution plan, STOP operators are placed in query execution plans wherever they can produce a beneficial cardinality reduction. In the aggressive policy embodiment, a stopping cardinality is computed for the STOP operator, based on the specified cardinality. Furthermore, in the aggressive embodiment a companion RESTART operator may be inserted into the query execution plan at a restart location above the specified location. The RESTART operator causes the query execution plan to restart when an input stream to the RESTART operator ends up containing fewer than a preselected number of tuples.

The invention can be embodied as an article of manufacture—a machine component—that is used by a digital processing apparatus and which tangibly embodies a program of instructions that are executable by the digital processing apparatus to support explicit declarative limitation of query result cardinality in a database management system that executes a user query by generating a set of tuples establishing the query result.

In another aspect of the present invention, a computer program product is disclosed which is readable by a digital processing apparatus and which tangibly embodies a computer program. This invention is realized in this regard as a machine component that causes a digital processing apparatus to perform the inventive method steps herein, which include receiving a query including a declaration of result set cardinality and generating a query execution plan in response to the query. As is conventional, the query execution plan has a treelike structure of operations for executing the query. However, according to the invention, the query execution plan includes one or more STOP operators that conservatively or aggressively limit the number of tuples returned in the query result, based on the declared cardinality.

In still another aspect, a computer-implemented method for defining a query result cardinality in a database management system that executes a user query with a STOP AFTER clause to generate a tuple stream which establishes the query result includes inserting at least one STOP operator in a query execution plan generated by a database management system. The number of tuples in an output tuple stream is thereby limited to a predetermined query result cardinality.

The details of the present invention, both as to its structure and operation, can best be understood in reference to the accompanying drawings, in which like reference numerals refer to like parts, and in which:

DETAILED DESCRIPTION OF THE PREFERRED EMBODIMENTS

Figure 1:
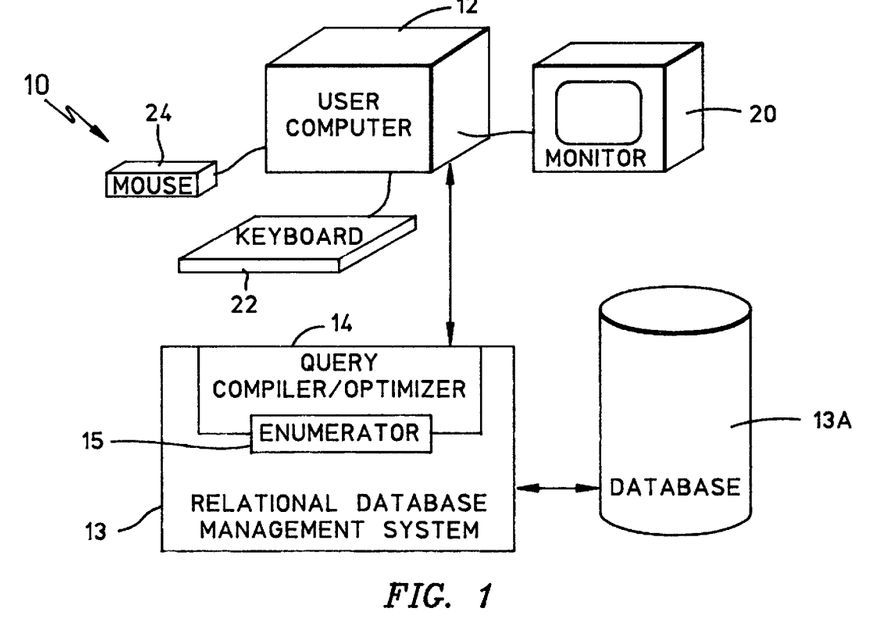
FIG. 1 is a schematic diagram of the present computer-based system incorporating a query optimizer for limiting the cardinality of a query result returned by a database management system.

Referring initially to FIG. 1, a system is shown, generally designated 10, for limiting, to a specified cardinality "N", the number of tuples returned in a query result generated by a database management system (DBMS) 13. The cardinality is specified in a query, by the user, according to the novel extension of SQL that embodies the invention. In the particular architecture shown, the system 10 includes a digital processing apparatus, such as a computer 12 with a main memory. In one intended embodiment, the computer 12 may be a personal computer made by International Business Machines Corporation (IBM) of Armonk, N.Y. as shown, or the computer 12 may be any computer, including computers sold under trademarks such as AS400, with accompanying IBM Network Stations. Or, the computer 12 may be a Unix computer, or OS/2 server, or Windows NT server, or IBM RS/6000 PowerStation 550 workstation running AIX, or an IBM laptop computer.

As shown schematically in FIG. 1, the computer 12 is associated with the database management system (DBMS) 13, with the DBMS 13 including a query compiler/optimizer 14 and an enumerator 15. The enumerator 15 is, precisely, a component of the query compiler/optimizer 14 that controls the way the search space of all possible query execution plans is explored. The query compiler/optimizer 14 can be executed by a computer as a series of computer-executable instructions. These instructions may reside, for example, in the main memory of the computer 12. In one preferred embodiment, the DBMS 13 comprises the DB2 product available from the International Business Machines Corporation for the MVS, AIX, or OS/2 operating systems. Manifestly, however, the invention applies to any DBMS software that executes a database access language.

Figure 2:
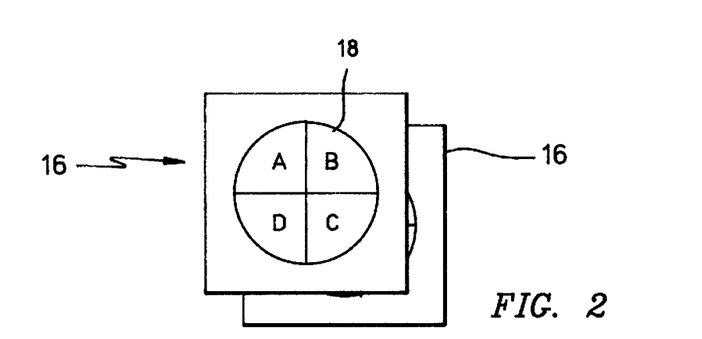
FIG. 2 is a schematic front plan view of a computer program device.

Alternatively, the instructions may be contained on a data storage device with a computer readable medium, such as one or more computer diskettes 16 shown in FIG. 2 having a storage medium 18 which contains computer-readable code elements A–D. Or, the instructions may be stored on a DASD array, magnetic tape, conventional hard disk drive, electronic read-only memory, optical storage device, or other appropriate data storage device. In an illustrative embodiment of the invention, the computer-executable instructions may be lines of compiled SQL-92 compatible code.

The Figures illustrate the structure of instructions as they may be embodied in a computer program. Those skilled in the art will appreciate that the Figures illustrate the structures of computer program code elements that function according to this invention. Manifestly, the invention is practiced in its essential embodiment by a software program that causes a digital processing apparatus (that is, a computer) to perform a sequence of function steps corresponding to those shown in the Figures. The software program may be stored on a machine component such is shown in FIG. 2 as a combination of program code elements A–D in computer readable form that are embodied in a computer-usable data medium 18, on the one or more computer diskettes 16. As mentioned above, however, such media can also be found in semiconductor devices, on magnetic tape, and on optical disks.

FIG. 1 also shows that the system 10 can include peripheral computer equipment known in the art, including an output device such as a video monitor 20 and an input device such as a computer keyboard 22 and mouse 24. Other output devices can be used, such as printers, other computers, and so on. Likewise, input devices other than the keyboard 22 and mouse 24 can be used, e.g., trackballs, keypads, touch screens, and voice recognition devices.

Extending SQL

In this invention, the specification of a cardinality limit for a query is supported by extending the syntax of the well-known SQL SELECT statement. In the invention this is done by a STOP AFTER clause which may be an optional suffix, i.e.:

SELECT . . . FROM . . . WHERE . . .

GROUP BY . . . HAVING . . .

ORDER BY <sort specification list>

STOP AFTER <value expression>

An SQL <value expression> is any expression that evaluates to an atomic value; it may be a constant, a computation of some sort, or even a subquery. In a STOP AFTER clause, the <value expression> must evaluate to an integer value that specifies the maximum number of result tuples desired. In addition, the <value expression> must be uncorrelated with the remainder of the query in order to ensure that the query's semantics are well-defined.

The semantics of a STOP AFTER query are straightforward: after doing everything else specified by the query, retain only the first N result tuples (where N is the integer that <value expression> evaluates to). In cases where the result of the query is totally ordered by the inclusion of an ORDER BY clause, only the first N tuples in this ordering are returned to the user. In cases where the particular N-tuple result set is not completely defined, due to duplicate values for the ORDER BY attribute(s), the choice of which of the candidate sets of N tuples will be returned is left unspecified. If there is a STOP AFTER clause, but no ORDER BY clause, then any N tuples that satisfy the rest of the query are considered to be a valid result. Finally, if there are fewer than N tuples in the result, then the STOP AFTER clause has no effect. These STOP AFTER semantics yield the same results as the cursor-based approach used by SQL applications according to the prior art.

In addition, the invention contemplates elimination of some of SQL's restrictions concerning ORDER BY clauses. First, SQL's restriction of requiring a query's ORDER BY column(s) to also appear in its SELECT list may be eliminated. Second, ORDER BY clauses may be allowed to appear in subqueries, as they become meaningful in subqueries that also have a STOP AFTER clause.

Processing STOP AFTER Queries

One approach to handling applications where a STOP AFTER clause is needed is to do so with little or no change to the database engine. This can be done externally, or it can be done by adding a very thin additional query processing layer to the engine. This layer could strip off the STOP AFTER clause and execute it (if necessary) to compute the desired stopping cardinality; it could then submit the remainder of the query to the engine, fetch results using the system's cursor interface until the desired number of tuples have been returned to the user, and then close the cursor. However, both the "external" and "thin layer" approaches miss opportunities for major performance improvements that can be obtained by making use of the desired cardinality limits according to the invention.

A better alternative is to extend the RDBMS to understand and process STOP AFTER queries. This is done in the invention by a new query operator, called STOP; this operator encapsulates the STOP AFTER functionality so that other operators, such as Sort and Join, need not be changed and can be used in STOP AFTER queries just as in other SQL queries. Two extreme heuristics may be used to place STOP operators in query execution plans: Conservative and Aggressive.

The STOP Operator

The STOP operator is a new logical query operator; it produces, in order, the top or bottom N tuples of its input stream. The STOP operator requires three parameters to be provided at query initialization time. The first is N, the desired number of result tuples. The second is a Sort Directive, which may take one of three values: desc, asc, or none. If the sort directive is desc(asc), the STOP operator sorts its input stream and returns the top (bottom) N tuples in descending (ascending) order. If the sort directive is none, the STOP operator simply returns the first N tuples from its input stream; the none option is chosen by the optimizer when the STOP operator's input stream is known to already be appropriately sorted. The third parameter to STOP is a Sort Expression. If the sort directive is desc or asc, the STOP operator sorts its input according to this sort expression, which is usually identical to the ordering expression from the ORDER BY clause of the query.

Like other logical operators (e.g., Join), the STOP operator can have more than one physical operator that is capable of implementing it in a query execution plan. Clearly, the implementation of the STOP operator should at least be dependent on its sort directive. Accordingly, two different physical STOP operators are defined: Scan-STOP, for when the sort directive is none, and Sort-STOP, for when the sort directive is desc or asc.

Scan-STOP

The Scan-STOP operator is a pipeline operator that requests, and then passes on, each of the first N tuples of its input stream on to its consumer (i.e., to the operator above it in the query execution plan), after which it closes down its input stream and returns an end-of-stream indicator to its consumer. As a result, the cost of the Scan-STOP operator itself is negligible, and the total cost of a query subplan rooted at a Scan-STOP operator is dominated by the cost required to produce the first N tuples of its input stream. In a state-of-the-art RDBMS, the query optimizer's cost model provides estimates for the total cardinality of a plan's output (ALL), the cost to produce the first tuple of a plan's output ($cost_P(1)$), and the cost to produce ALL output tuples ($cost_P(ALL)$). Given estimates for these quantities for the subplan that generates the input stream for the Scan-STOP operator, the optimizer can estimate the cost, $cost_S(N)$, for the whole plan rooted at the Scan-STOP(N) operator as follows:

$$cost_S(N) = cost_P(1) + (cost_P(ALL) - cost_P(1)) * \frac{N}{ALL} \quad (1)$$

This estimate assumes that the tuples after the first one are generated smoothly by the subplan that feeds into the Scan-STOP operator, i.e., that $cost_p(k+1) - cost_p(k)$ is more or less constant for $1 \leq k < ALL$. Also, it assumes that $N \leq ALL$ (since for $N > ALL$, $cost_S(N) = cost_S(ALL)$).

Equation 1 implies that the optimizer is likely to favor pipelined query execution plans (e.g., query execution plans with nested-loop join operators) for STOP AFTER queries, particularly when the cardinality limit N is small. This is because pipelined execution plans quickly produce their first row (i.e., $cost_P(1) \approx 0$); therefore, the relative cost of the STOP AFTER query will be proportional to its cardinality limit N. In contrast, if the Scan-STOP operator's input stream is produced by a pipeline-breaking subplan (e.g., one with a sort-merge join in it), then the cost to produce N tuples will be almost the same as the cost to produce ALL tuples.

Sort-STOP

If the input of a (logical) STOP operator is not already sorted, then the STOP operator must consume and sort its whole input to produce the top or bottom N output tuples. For relatively small N (which is expected to be the most common case), the sorting can be carried out in the main memory of the computer 12 using a priority heap. The first N tuples consumed by the Sort-STOP operator can be inserted into a priority heap, and the remaining tuples can then be tested with the heap's membership bound to determine whether or not the new tuple's value warrants its insertion into the heap. The cost of producing N results with this implementation of the Sort-STOP operator has the following three components: (1) the cost of generating the whole input stream for the Sort-STOP operator ($cost_P$ (ALL)), (2) the cost of testing ALL-N tuples against the heap's membership bounds ((ALL)-N)* C, (where C is the cost of a comparison), and (3) the cost of inserting i qualifying tuples into a heap with at most N elements (where i is estimated below). In all, the resulting plan cost can be estimated as shown in Equation 2; again, we assume $N \leq ALL$, as for $N > ALL$, $cost_S(N) = cost_S(ALL)$.

$$cost_S(N) = cost_P(ALL) + (ALL-N)*C + i*\log(N) \quad (2)$$

Assuming randomly ordered data, i can be estimated as:

$$i = N + \frac{N}{N+1} + \frac{N}{N+2} + \ldots + \frac{N}{ALL} = (H_{All} - H_N + 1) * N \quad (3)$$

(Here, $H_k$ denotes the k-th harmonic number.)

Again this cost estimate assumes that N is small and that a heap of N tuples will fit in main memory. For larger N, external sorting is required. Further it is assumed that a Sort-STOP implementation uses an ordinary external Sort operator in conjunction with the Scan-STOP operator when N is large.

Use of STOP AFTER

Figure 3:
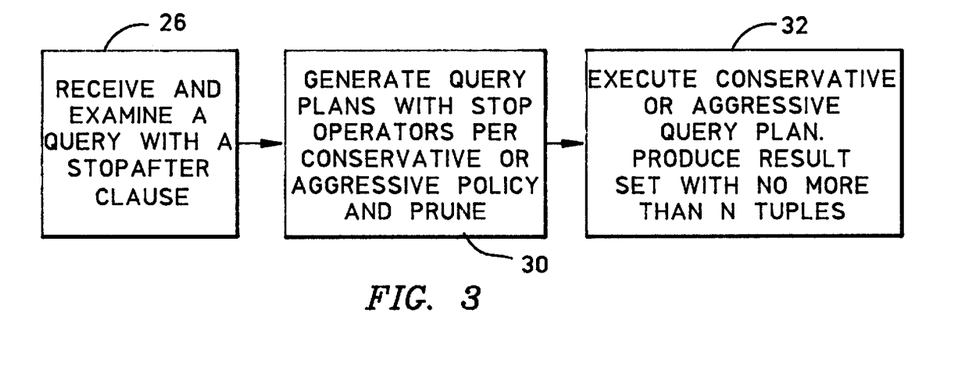
FIG. 3 is a flow chart showing the overall method steps of the present invention.

FIG. 3 shows a sequence of steps for processing a query according to the present invention. At block 26, a query is received by the DBMS 13 from a user. As pointed out in incorporated U.S. Pat. No. 5,590,324, a query may be received from an interactive environment or embedded in source code. The query is examined in the main memory of the computer 12. The query, per the present invention, includes a STOP AFTER clause, followed by an expression that evaluates to a desired query result cardinality. For this example, the query also includes an ORDER BY clause. Assume in this example that the user wants to know the ten highest paid employees contained in the database 13A. Accordingly, the user might input a query that includes "Order By e.salary DESC" followed by STOP AFTER 10. In so doing, the user indicates that only the first ten tuples (representing, in this example, the ten highest paid employees) of the query result stream that is to be generated by the DBMS 13 are desired in response to the query.

Next, at block 30, one or more query execution plans are generated by the query compiler/optimizer 14 of the DBMS 13 in accordance with principles discussed below. In a preferred embodiment, the query execution plans are generated based on either a conservative policy or an aggressive policy as set forth herein, provided that the first column of the ORDER BY clause can be computed as discussed below. Then, the plans are pruned. After query execution plan generation, the overall process moves to block 32 to execute the query execution plan per the chosen conservative or aggressive query execution plan, to thereby return a query result having the desired cardinality, i.e., to return a query result to the user having only "N" tuples.

Figure 4:
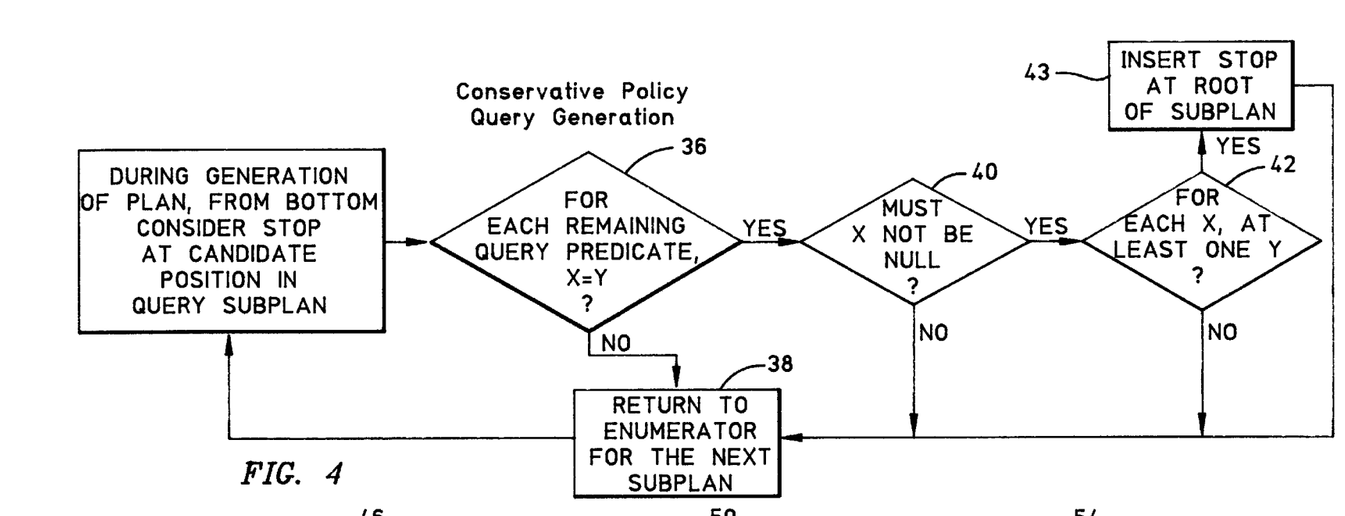
FIG. 4 is a flow chart showing the conservative policy.

Now referring to FIG. 4, the generation of query execution plans by the RDBMS query compiler/optimizer 14 using a conservative policy that embodies the present invention is shown. In accordance with the principles of the conservative policy, a STOP operator is never inserted in a query execution plan at a location which would cause tuples to be discarded, if the tuples might be required to compose the "N" tuples of the query result.

Intuitively, a STOP operator can be applied to a tuple stream if every tuple in that stream is guaranteed to generate at least one tuple of the overall query result. During query optimization, this condition can be tested for a tuple stream produced by a subplan by (i) inspecting the query predicates that remain to be applied following the subplan (to complete the query), and (ii) examining the integrity constraints involving columns that participate in these remaining predicates. The condition is satisfied for the subplan's output stream if each of the remaining predicates is non-reductive, defined as follows:

1. the predicate is of the form x=y, where x is an expression computable from the stream and y is an expression involving one or more tables yet to be added to the plan, and 2. it can be inferred from the database integrity constraints that (i) x cannot be null, and (ii) for each x there must exist at least one y such that x=y holds.

For example, if x is a column with a NOT NULL constraint, and the database has a referential integrity constraint declaring that x is a foreign key that references a table yet to be joined whose key is y, then these criteria are met—making x=y a non-reductive predicate. In the case of outer-join predicates, the two conditions can be relaxed because a tuple from the outer relation survives even if no matching tuple from the inner relation exists. In the case of GROUP BY or DISTINCT queries, if the grouping operation (or duplicate elimination) remains to be done, a similar set of rules can be derived. In this case, the tuple stream must be functionally dependent on the GROUP BY (or DISTINCT) column(s), and any HAVING predicates must also satisfy the conditions above so that all groups will survive. Naturally, the Conservative STOP insertion conditions will always hold at the root of a plan for the whole query because no predicates remain to be applied at that point. In all cases, the STOP operator inserted will have a cardinality parameter of N, where N is the value specified in the STOP AFTER clause.

The constraint that each incoming tuple will generate one or more result tuples can be satisfied for a STOP operator inserted at a position in query execution plan if each of the remaining predicates of the plan (i.e., the predicates above the position at which the STOP operator is proposed to be inserted) is non-reductive.

FIG. 4 shows functionally how the present invention determines whether the relevant predicates are non-reductive, for a candidate "STOP" operator insertion in a candidate query execution plan. The Figure presumes that a plan is being constructed by enumeration from the bottom up, with candidate subplans being generated and combined by the query compiler/optimizer 14.

Figure 5A:
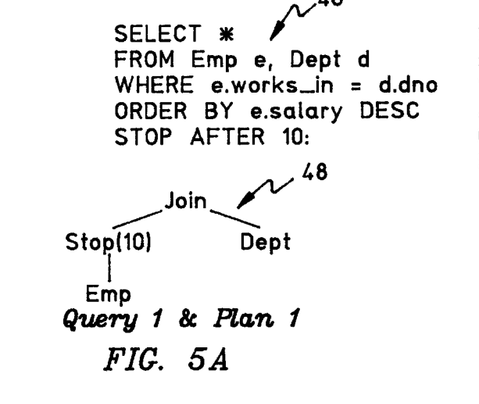
FIGS. 5(a)–5(c) are schematic diagrams showing respective sample queries and associated query execution plans enumerated by the conservative policy.
Figure 5B:
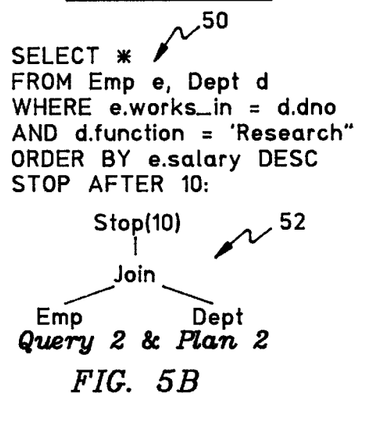
Figure 5C:
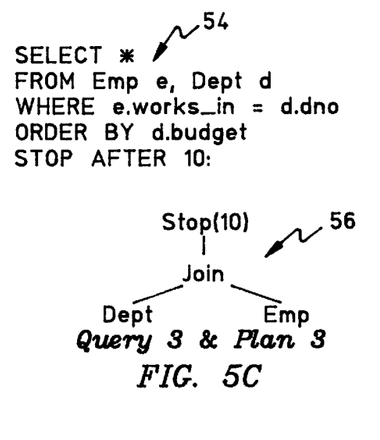

At block 34 of FIG. 4, a STOP operator is considered for insertion at the lowest point of a candidate query execution plan being generated by the query compiler/optimizer 14 in response to a user query. (Examples of such queries and their respective query execution plans are shown in FIGS. 5(a)–5(c).) In this regard, as subplan is generated, consideration is given to inserting a STOP operator at the subplan's root. Insertion of the STOP operator is predicated on satisfaction of the non-reductivity condition, which is tested as subplans are enumerated. Thus, beginning at decision diamond 36, the query compiler/optimizer 14 determines, for each predicate that is yet to be applied at the location of (i.e., will be applied above) the proposed STOP operator, whether the predicate is of the form x=y, as per the first test defined above. If the test at decision diamond 36 is negative, indicating that no STOP operator should be inserted at the position under test, the process moves to block 38 to return control to the plan enumerator of the query compiler/optimizer 14. On the other hand, if the test at decision diamond 36 is positive, the process moves to decision diamond 40 to test the second condition of non-reductivity for inserting a conservative STOP operator. More specifically, at decision diamond 40 the query compiler/optimizer 14 determines whether, from database integrity constraints, it can be inferred that x cannot be null. If x can be null, the process moves back to block 38, but otherwise the process continues to decision diamond 42 to determine whether, for each x, it can be inferred from database integrity constraints that at least one y exists such that x=y holds. If all three tests set forth above are positive, indicating that the predicates above the candidate "STOP" operator insertion position are non-reductive, the process moves to block 43 to insert a STOP operator at the candidate position, and then returns to the plan enumerator to generate the next subplan.

It is to be understood that the STOP operator can be implemented by more than a single physical operator. For example, in the preferred embodiment the STOP operator can be implemented by the sort-STOP operator, by first sorting the table or tuple input stream affected by the STOP operator when the table or input stream is not already sorted, and then truncating the stream to the desired cardinality. Moreover, the STOP operator can be implemented by the scan-STOP operator, by simply truncating the table or input stream to the desired cardinality, when the table or input stream is already sorted. The sort-STOP operator can execute the sorting in main memory using a priority heap in accordance with principles well-known in the art; any other internal or external sorting technique will work as well.

As mentioned above, sample queries with their respective conservative policy query execution plans are shown in FIGS. 5(a)–5(c). FIG. 5(a) shows a query in which the user desires to know the ten highest paid employees in a particular database. In the example shown, a table "emp" includes the employees' names, salaries, work_in (department no.), teaNo (travel expense account), wherein the underlined columns are primary keys for the table and the italicized columns are so-called foreign keys, i.e., keys to other tables. Further, a table "Dept." includes a department number, employee name, budget, function, and description, and a table "TEA" includes an account number, expenses, and comments. For present disclosure purposes, it is assumed that every employee must work in a department; thus, the database specification for Emp.works_in is NOT NULL. In contrast, not every employee must have a travel expense account; accordingly, the database specification for Emp.teaNo would indicate "NULL ALLOWED".

The query execution plans of FIGS. 5(a) through 5(c) are representations of more complex structures whose details are known (except for STOP operators) but are not important to an understanding of the invention. Each of these plans includes subplans, operators, and tuple streams. For example, in FIG. 5(c) "Emp" represents a subplan that includes a scan on a table called Emp (employee). The line extending upwardly from Emp is an output stream of tuples that flows (upwardly) in the plan. Without the STOP(10) operator, the output tuple stream from subplan Emp would connect the root of the subplan to an input node of subplan Join. The stream would also be an input tuple stream to the Join subplan. Therefore, for the purposes of this description, in FIG. 5(a) the STOP(10) operator is located at the root of the Emp subplan and is applied to the (output) tuple stream produced by the subplan.

With the above in mind, a query 46 shown in FIG. 5(a) requests to know by employee name and department number, in descending order, who the top ten salaried employees are. In this example, a STOP operator (10) is placed in a candidate query execution plan 48 just below the join of the Emp table and the Dept. table, because e.works_in=d.dno is a non-reductive predicate. More particularly, joining the Emp stream with the Dept table after the STOP operator has truncated the "Emp" stream will not reduce the Emp stream further, since the constraint exists that every employee must be related to a department.

On the other hand, in FIG. 5(b), the user has requested to know the ten highest paid employees in the research department only, using a query 50. The resulting query execution plan 52 does not place the STOP operator beneath the join because two predicates remain at that point in the plan: e.works_in=d.dno and d.function=research, and the latter predicate is not non-reductive (i.e., the test at decision diamond 42 in FIG. 4 would be negative below the join). Specifically, if the Emp tuple stream were reduced to the ten highest paid employees before the join, the query could come up short, as joining those employees with only the research department could eliminate many of them.

As a final example of a conservative query execution plan, FIG. 5(c) shows a query 54 desiring to know the bottom ten tuples by departmental budget. A resulting query execution plan 56 places the STOP operator above the join. This is because the join predicate itself is non-reductive, in that there is no guarantee that every department has at least one employee (that is, the test at decision diamond 40 in FIG. 4 would be negative below the join).

Figure 6:
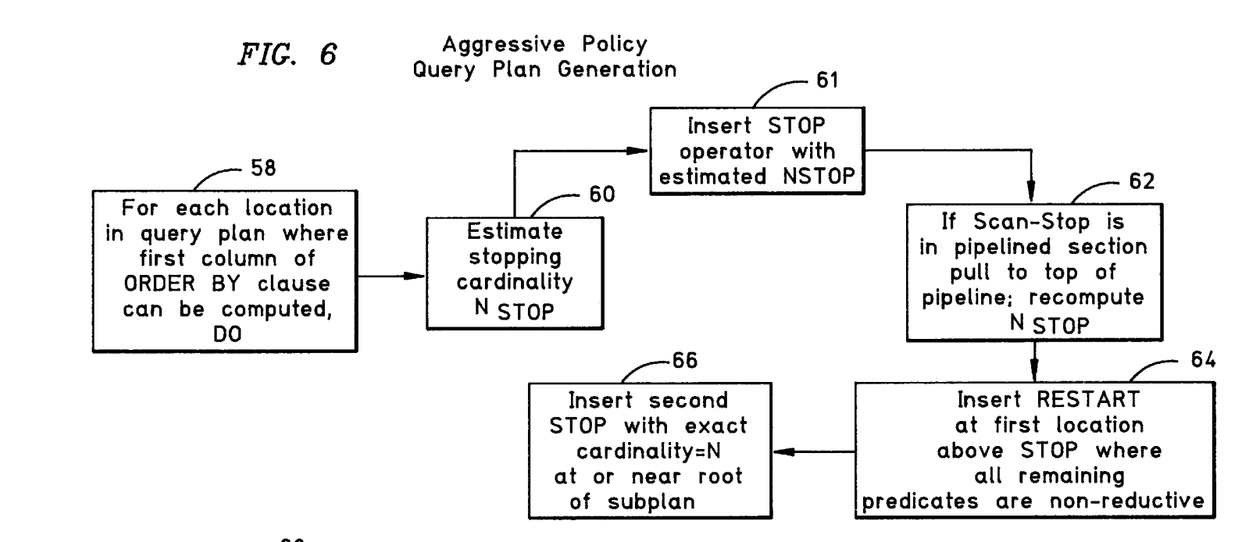
FIG. 6 is a flow chart showing the aggressive policy.

Now referring to FIG. 6, an aggressive policy that embodies the present invention can be appreciated. In accordance with the present invention, under the aggressive policy the query compiler/optimizer 14 inserts a STOP operator in a query execution plan wherever (and as soon as) it can provide a beneficial cardinality reduction. Note that the aggressive policy will not discard tuples that should be returned in, e.g., a "top ten" request in favor of tuples that should not be, because the aggressive policy operates on sorted tuple streams (or it first sorts the tuple streams before trimming them, if the tuple streams are unsorted, by the above-described sort-stop operator). Thus, the risk of the aggressive policy is simply that sufficient tuples will not be returned, i.e., that a number of tuples less than the predetermined cardinality N will be returned, resulting in a prefix of the actual query answer. This risk is eliminated by a RESTART operator, described below. Again, no risk exists that incorrect tuples will be returned.

To generate an aggressive query execution plan, the process shown in FIG. 6 begins at block 58, where it is understood that, as the plan is being generated from the bottom up by the query compiler/optimizer 14, the process enters a Do loop that walks the current subplan from the bottom up to find a location in the subplan where the first column of the ORDER BY clause can be computed, that is, where the top or bottom tuples with respect to the requested result order can be computed. Moving to block 60, a stopping cardinality $N_{stop}$ for the candidate STOP operator to be inserted at this position in the plan is estimated as follows:

$N_{stop}$=N * ($ALL_{subplan}/ALL_{query}$), wherein N is the requested cardinality of the result, $ALL_{query}$ is the estimated number of tuples that would be produced by the query execution plan as a whole without any STOPs, and $ALL_{subplan}$ is the estimated number of tuples that would be produced by the subplan that feeds tuples into the STOP operator under test.

In practice, the estimated stopping cardinality can be inflated over the value computed above by, e.g., 20% to accommodate estimation error, and this reduce the risk of a RESTART being needed. In block 61, a STOP operator is inserted, with the estimated stopping cardinality. The operator is a Scan-stop if sorting has occurred; otherwise, the operator is a Sort-stop operator.

Then, at block 62, if the STOP operator is a scan-stop operator in a pipelined subplan (such as a nested loop index join), the operator is "pulled" to the top of the pipeline to reduce the risk of requiring a restart, and the stopping cardinality recomputed for that position.

From block 62, the method moves to block 64 to insert a RESTART operator at the first position above the STOP operator where all remaining predicates are non-reductive. When the RESTART operator receives less than the predetermined number "N" of tuples, it closes and then reopens the software-implemented iterator that is associated with the operator that feeds tuples to the RESTART operator from the subplan immediately beneath the RESTART operator, as more fully disclosed below in reference to FIG. 8. This handles cases where too few tuples are generated by the first STOP operator at runtime. It is to be appreciated that although restarts, when triggered, can be somewhat costly (as compared to aggressive query execution plans that are executed without restarts), the cost will be mitigated in that much of the relevant data to be reprocessed will be in the buffer pool of the database system.

Finally, at block 66, a second STOP operator with cardinality=N is inserted at or near the current root of the emerging query execution plan. The second STOP operator will limit the number of result tuples produced in the event that too many result tuples are generated by the first STOP operator at the runtime.

Figure 7A:
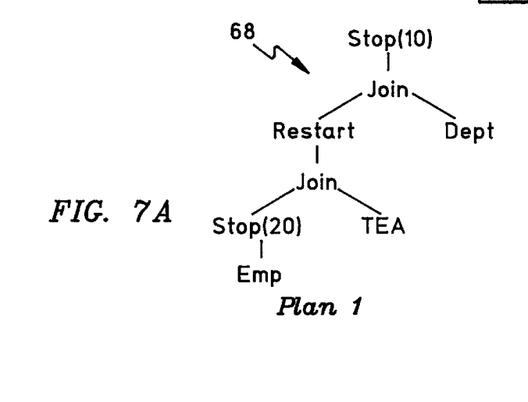
FIGS. 7(a) and 7(b) are schematic diagrams showing query execution plans enumerated by the aggressive policy.
Figure 7B:
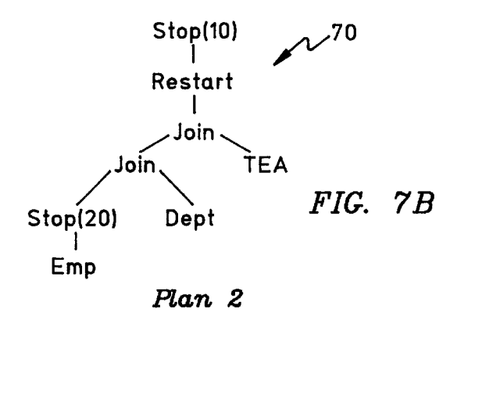

FIGS. 7(a) and 7(b) show examples of candidate aggressive query execution plans that execute the following query:

SELECT e.name, e.salary, d.name, t.expenses

FROM Emp e, Dept d, TEA t

WHERE e.works_in=d.dno AND e.teaNo=t.accountNo

ORDER BY e.salary DESC

STOP AFTER N

The above query requests the N highest paid employees in descending order, along with their department name and travel expenses. Recall that the database constrains all employees to work in a department, but not all employees to have a travel account. For illustration, assume that half the employees have travel accounts. In plan 1 of candidate query request 68 shown in FIG. 7(a), EMP is joined with TEA first, and a STOP operator is placed just above the scan of EMP, at which point the stopping cardinality $N_{STOP}$ is set to 20 ($ALL_{subplan}/ALL_{query}$=2 and N=10). Further, in accordance with the above-disclosed aggressive policy principles, a RESTART operator is placed above the first join and prior to a second join with DEPT, i.e., at a position where all higher predicates are non-reductive. Particularly when the EMP/TEA join is non-pipelined (e.g., a sort-merge or a hash join), the candidate aggressive query execution plan 68 shown in FIG. 7(a) can provide significant computer time cost savings over its conservative policy counterpart.

Moving to FIG. 7(b) and a second candidate aggressive plan 70, the join with the TEA table comes last, as shown, after the tables EMP and DEPT are joined. In accordance with present principles, a conservative policy query execution plan would be forced to place a STOP operator no lower than the root of the plan, whereas the aggressive query execution plan 70 shown in FIG. 7(b) places a STOP operator just above the table access to EMP, and a RESTART operator at the root of the plan, thereby affording a potential large cost savings vis-a-vis a conservative query execution plan, particularly if either join in FIG. 7(b) is not pipelined.

Restarts and Plan Refinement

The job of the RESTART operator introduced above is to make sure that, above the point where it is placed in the query execution plan, at least N tuples will surely be generated. If the RESTART operator's input stream is exhausted before N tuples are received, then it must "RESTART" the query subplan beneath it to generate the required, but missing results. There are several possible strategies for actually restarting a query subplan. Ideally, the missing tuples would be computed without recomputing any of the results already gathered. However, this would be difficult (if not impossible) to accomplish in some situations without making all of the system's operators restartable.

To handle restarts without changing existing runtime operators, the invention adopts a simple approach: the RESTART operator closes and then re-opens the iterator associated with the operator that feeds it tuples from the subplan immediately beneath it—causing the root operator of the subplan to recursively close and re-open its own iterator(s), and so on down the line. The STOP operator in the scope of the subplan reconfigures itself when it is reopened by increasing its stopping cardinality by some predetermined factor (e.g., a factor of 2) to let more data through the next time around. The other operators in the subplan start over from the beginning, though their cost will be lower since much of the relevant data will still be in the buffer pool. To ensure that the correct number of results are ultimately produced, the RESTART operator repeats this process (if necessary) until it has produced N tuples, or there are no more tuples to produce.

RESTART operator insertion can be done by post-processing the query compiler/optimizer's chosen query execution plan as follows: Find the non-Conservative STOP operator in the plan and insert a RESTART operator at the first point above it where all remaining predicates are non-reductive. If N results are produced there, the plan is "safe"; no further cardinality shrinkage can occur. The post-processor can simply walk up the plan tree from the non-Conservative STOP operator in order to place the RESTART as deeply as possible (to minimize the cost of a restart).

For Aggressive query execution plans that are fully pipelined, or have pipelined sections, the invention provides an additional plan refinement: Scan-Stop pullup. This transformation pulls Scan-Stop operators residing in a pipelined segment of a query execution plan up to the top of the pipeline. This reduces the risk of restarts, as it re-positions the Scan-Stop above reductive predicates in the pipeline (whose impact on the tuple stream cardinality might be difficult to estimate). In the extreme case, when all the remaining reductive predicates are applied in the pipeline, Scan-Stop pullup converts an Aggressive Scan-Stop operator into a Conservative one—completely eliminating the risk of restarts; Scan-Stop pullup must, therefore, be performed before RESTART operator placement, and when the pullup transformation is performed, the cardinality parameter of the affected Scan-STOP operator must, of course, be recomputed based on its new position in the query execution plan. The Scan-STOP pullup is never detrimental. Consider, for example, a Scan-STOP operator sitting immediately beneath a pipelined operator such as a nested loop index join (NLIJ). In such a case, nothing is gained by having the Scan-STOP operator sit beneath the NLIJ operator, because the NLIJ produces output incrementally, on demand—i.e., its cost is proportional to the amount of data that is asked to materialize, not to the size of its inputs. Thus, the Scan-STOP operator can be pulled up above the NLIJ without increasing the cost of the plan. This pullup opportunity arises because the two NLIJ plans will have the same cost during plan enumeration, and the risk of restarts is not taken into account during enumeration.

Figure 8:
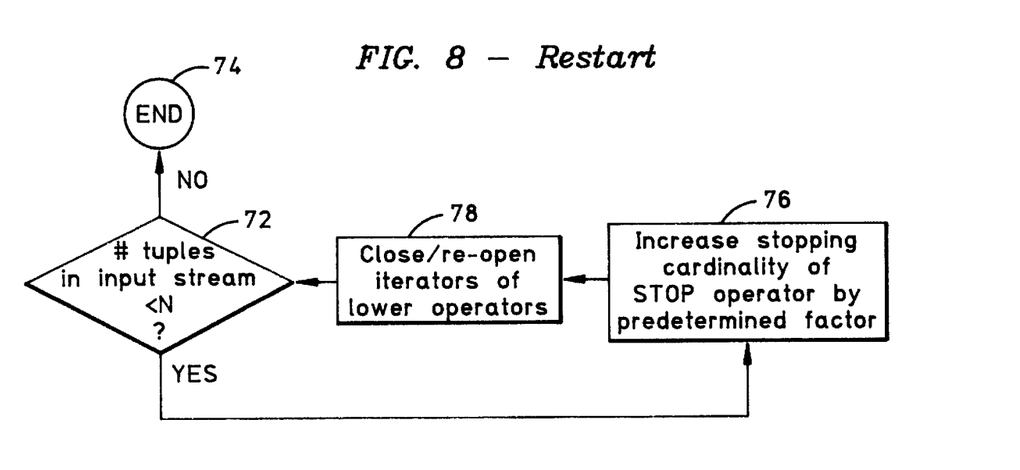
FIG. 8 is a flow chart showing the restart steps in an aggressive policy.

FIG. 8 illustrates the restart operation of the present aggressive policy. Commencing at decision diamond 72, the RDBMS 13 determines (during query execution) whether the number of tuples in the input stream received by the RESTART operator is less than the predetermined cardinality N. If sufficient tuples have been received, the restart process ends at state 74. Otherwise, if insufficient tuples have been received by the RESTART operator to return N tuples as requested to the user at block 76, the stopping cardinality of the STOP operator is increased by some predetermined factor, e.g., 2. Then the process moves to block 78, wherein the iterators of operators below the RESTART operator are caused to close and reopen and the process is repeated (if necessary) until sufficient tuples are received by the RESTART operator to fill the requested cardinality.

Extended Query Optimization

STOP operators impact the cost of other operations in a query execution plan, thus affecting optimization decisions such as access path selection, join methods, and join orderings. The invention supports extensions of the query compiler/optimizer 14—assuming use of dynamic programming—to incorporate STOP placement policies.

Plan Enumeration

The query compiler/optimizer 14 uses rules to control the enumeration of alternative query execution plans. To enumerate all possible plans with STOP operators, the rule set is modified to model the STOP operator as another kind of access path for intermediate results. This will cause the query compiler/optimizer 14 to consider adding a STOP operator immediately after each of its usual ways of accessing either base data or subplan data. Moreover, this change introduces STOP operators into the system with minimal impact on the query compiler/optimizer 14 as a whole, as the rest of its rule set remains untouched. This is important to ensure modularity, and therefore maintainability, of the query compiler/optimizer's STOP-enhanced rule set. The insertion of a STOP operator must also be considered at the root of each query execution plan to ensure that the right number of result tuples (as specified by the STOP AFTER clause) will be returned to the application. This can be accomplished through another new rule that considers adding a STOP operator at this final point.

Once these additional STOP rules have been established, both the Conservative and Aggressive policies can easily be integrated by defining conditions that control in which situations (i.e., for which subplans) a STOP rule can be applied; again, other rules of the optimizer are not affected. A vital condition for both policies is that a STOP operator may only be generated at places in a plan where the top or bottom tuples can be identified (i.e., where at least the first column of the query's ORDER BY expression is computable). To implement the Conservative policy, the conditions of the STOP rules would further be restricted to generate STOP operators only at safe places. Such a restriction does not apply to the Aggressive policy.

Plan enumeration is made more efficient by avoiding the enumeration of plans with superfluous STOP operators. To keep track of the places where a STOP operator is useful, the invention introduces an additional plan property called "stopping cardinality." (The use of plan properties is a common technique implemented in most query compiler/optimizers.) For the Conservative policy, the stopping cardinality property can take one of two values: ENFORCED, indicating that the plan's result stream already satisfies the STOP AFTER clause's cardinality specification, or NOT ENFORCED, indicating that this is not true. At leaves of plan (e.g., table scans), the stopping cardinality property is set to NOT ENFORCED; it is set to ENFORCED when a (Conservative) STOP operator is added to the plan. This property is "destroyed" (reset to NOT ENFORCED) by operators that potentially change the cardinality of their input streams (e.g., certain joins), and is transported by other operators. Using the Conservative policy, therefore, STOP operators can only be added to NOT ENFORCED subplans, and again, this constraint can be implemented in the condition part of the rules.

In addition to ENFORCED and NOT ENFORCED, the stopping cardinality can be set to ASSISTED to support the Aggressive policy. This is done by a non-Conservative STOP operator whose stopping cardinality is based on cardinality estimates, and it specifies that cardinality reduction has been performed but that an additional STOP operator is needed at (or near) the root of the plan to guarantee ENFORCED cardinality for the whole plan. An ASSISTED stopping cardinality is transported by every operator; it is overwritten by the final Conservative STOP operator, so only plans with at most one non-Conservative STOP operator are enumerated.

Plan Pruning

Figure 9:
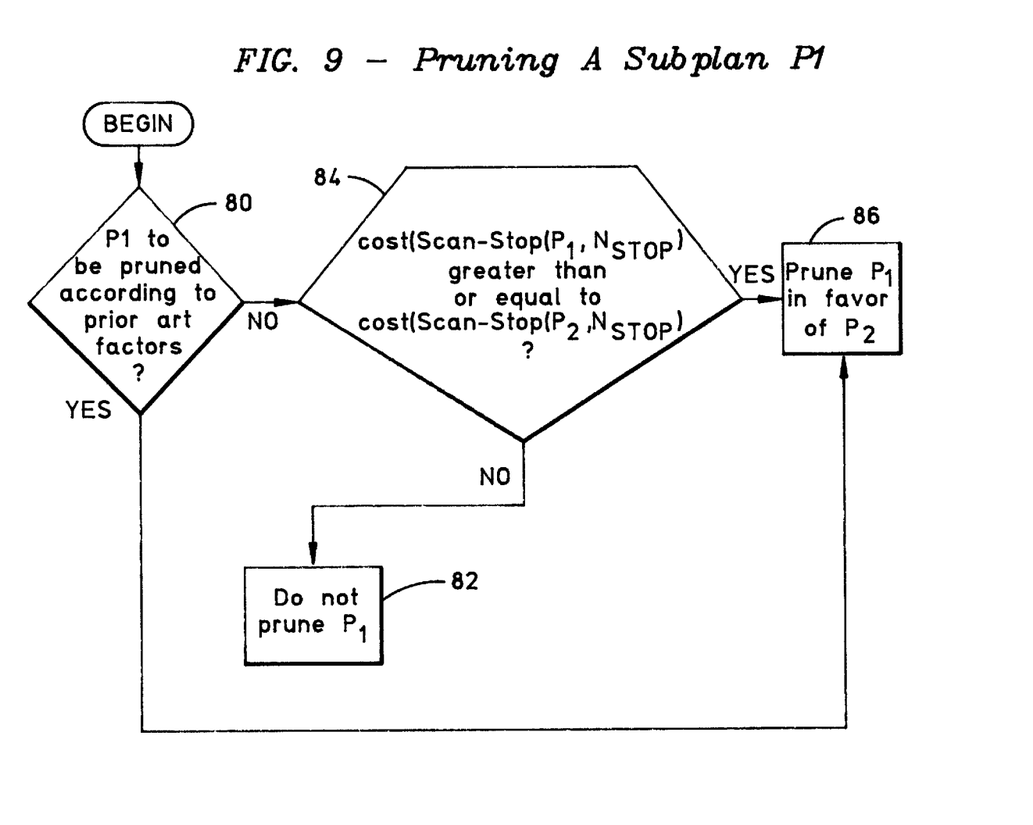
FIG. 9 is a flow chart showing the query execution plan and subplan pruning convention of the present invention.

FIG. 9 shows that plans and subplans are pruned using both conventional pruning principles and novel pruning principles as follows. According to conventional pruning, a plan (or subplan) P1 is pruned in favor of a plan (or subplan) $P_2$ if and only if $P_1$ has higher cost and weaker properties than $_2P$ In addition to properties considered for prior art optimization, the STOP-AFTER clause (and STOP operators) of the invention require the query compiler/optimizer 14 to respect new pruning conditions. In this regard, at decision 84 the query compiler/optimizer 14 must determine whether cost(scan-STOP($P_1$, $N_{STOP}$))≧cost(scan-STOP($P_2$, $N_{STOP}$)), wherein scan-STOP is the plan cost discussed above and $N_{STOP}$ is the stopping cardinality discussed above. Only when the test at decision diamond 84 is positive does the process move to block 86 to prune the first candidate plan $P_1$ in favor of the second candidate plan $P_2$; otherwise, even if it is comparatively costly, plan $P_1$ might be part of the overall best plan to produce N tuples, and so the process would move under these conditions to block 82.

While the particular METHOD AND SYSTEM FOR LIMITING THE CARDINALITY OF AN SQL QUERY RESULT as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims.

We claim:

1. A method of generating a query execution plan in a computer with a memory responsive to a query including a specified size for a result of the query, comprising:

generating a query execution plan in the memory of the computer; and inserting at least one STOP operator in the query execution plan for limiting the size of the query result to no more than a specified cardinality.

2. The method of claim 1, wherein the STOP operator is inserted in a conservative location of the query execution plan, the conservative location being characterized such that no tuples are discarded during execution of the query that may be required in the query result.

3. The method of claim 2, wherein the conservative location is characterized such that predicates in the query execution plan above the conservative location are non-reductive.

4. The method of claim 1, wherein the query includes an ORDER BY clause and the STOP operator is inserted in an aggressive location of the query execution plan, the aggressive location being characterized such that a first column of the ORDER BY clause may be computed.

5. The method of claim 4, wherein the aggressive location is a location in the query execution plan below at least one non-reductive predicate in the query execution plan.

6. The method of claim 5, flier comprising determining a stopping cardinality for the STOP operator, based on the specified cardinality.

7. The method of claim 4, further comprising inserting a RESTART operator into the query execution plan at a restart location above the aggressive location, the RESTART operator for restarting execution of the query when an input stream to the RESTART operator contains fewer than a preselected number of tuples.

8. The method of claim 7, wherein the restart location is characterized such that predicates in the query execution plan above the restart location are non-reductive.

9. A method executable by a computer for limiting the size of a query result in a database management system in response to a query, comprising:

receiving a query in the memory of the computer;

examining the query to determine whether the query includes a requirement for a size of a result of the query;

generating at least one query execution plan in response to the query; and;

inserting at least one STOP operator in the query execution plan for limiting a number of tuples in the result to a cardinality number corresponding to a required size of the result.

10. The method of claim 9, further comprising generating a query execution plan with a plurality of predicates.

11. The method of claim 10, further comprising the step of:

inserting the STOP operator in a conservative location of the query execution plan, the conservative location being characterized such that predicates in the query execution plan above the conservative location are non-reductive.

12. The method of claim 10, further comprising:

inserting the STOP operator in an aggressive location of the query execution plan, the aggressive location being characterized such that the aggressive location is below at least one non-reductive predicate in the query execution plan.

13. The method of claim 12, further comprising determining a stopping cardinality for the STOP operator, based on the requirement for size of the result.

14. The method of claim 13, further comprising inserting a RESTART operator into the query execution plan at a restart location above the aggressive location, the RESTART operator for causing execution of the query execution plan to restart when an input stream to the RESTART operator contains fewer tuples than the stopping cardinality.

15. The method of claim 14, wherein the restart location is characterized such that predicates in the query execution plan above the restart location are non-reductive.

16. A computer program device comprising:
   a computer program storage device readable by a digital processing apparatus; and
   a program means on the program storage device and including instructions for causing the digital processing apparatus to limit the number of tuples returned by a database management system in a query result, by:
   receiving a query including specification of a result cardinality;
   generating a query execution plan in response to the query, the query execution plan having predicates for executing the query; and
   placing an operator in the query execution plan to limit a number of tuples returned in the query result to no more than the result cardinality.

17. The computer program device of claim 16, wherein limiting is accomplished by inserting at least one STOP operator in the query execution plan, the STOP operator for limiting the size of an output stream in the query execution plan.

18. The computer program device of claim 17, the program means is further for:
   inserting the STOP operator in a conservative location of the query execution plan, the conservative location being characterized such that predicates in the query execution plan above the conservative location are non-reductive.

19. The computer program device of claim 17, the program means is farther for:
   inserting the STOP operator in an aggressive location of the query execution plan, the aggressive location being characterized such that the aggressive location is below at least one nonreductive predicate in the query execution plan.

20. The computer program device of claim 19, the program means is further for determining a stopping cardinality for the STOP operator, based on the result cardinality.

21. The computer program device of claim 20, the program means is further for inserting a RESTART operator into the query execution plan at a restart location above the aggressive location, the RESTART operator for causing execution of the query execution plan to restart when an input stream to the RESTART operator contains fewer than a predetermined number of tuples.

22. The computer program device of claim 21, wherein the restart location is characterized such that predicates in the query execution plan above the restart location are non-reductive.

23. A method for querying a database using a database management system, the method executable on a computer with a memory and including:
   receiving in the memory of the computer a query that includes a clause limiting the size of a query result to N;
   executing the query to produce a result set of tuples that satisfy the query;
   during execution of the query, limiting the number of tuples in the result set to no more than N; and
   returning the result set to a user.

24. The method of claim 23, wherein the clause is a STOP AFTER clause.

25. The method of claim 24, wherein the query further includes an ORDER BY clause.

* * * * *